United States Patent
Saito et al.

[11] Patent Number: 5,920,558
[45] Date of Patent: Jul. 6, 1999

[54] ATM SWITCH AND ATM SWITCHING SYSTEM

[75] Inventors: Toshitada Saito, Kawasaki; Jun Hasegawa, Yokohama; Masahiro Okada, Urayasu; Toshio Fujisawa, Yokohama, all of Japan

[73] Assignee: Kabushiki Kaisha Toshiba, Tokyo, Japan

[21] Appl. No.: 08/829,428

[22] Filed: Mar. 31, 1997

[30] Foreign Application Priority Data

Mar. 4, 1996 [JP] Japan ................................ 8-081291

[51] Int. Cl.⁶ .............................. H04J 3/22; H04L 12/50
[52] U.S. Cl. .......................... 370/359; 370/394; 370/395
[58] Field of Search .................... 370/229, 230, 370/232, 234, 235, 357, 359, 360, 389, 391, 392, 394, 395, 396, 400, 419, 420, 463

[56] References Cited

U.S. PATENT DOCUMENTS

| | | | |
|---|---|---|---|
| 5,506,842 | 4/1996 | Beck et al. | 370/395 |
| 5,513,174 | 4/1996 | Punj | 370/394 |
| 5,535,196 | 7/1996 | Aihara et al. | 370/419 |
| 5,548,593 | 8/1996 | Peschi et al. | 370/394 |
| 5,570,368 | 10/1996 | Murakami et al. | 370/395 |
| 5,724,354 | 3/1998 | Tremel et al. | 370/395 |
| 5,729,530 | 3/1998 | Kawaguchi et al. | 370/236 |

*Primary Examiner*—Chi H. Pham
*Assistant Examiner*—Ricky Ngo
*Attorney, Agent, or Firm*—Loeb & Loeb LLP

[57] ABSTRACT

A switch executes complex protocol processing on control cells easily at a high speed in the same manner as normal cells are processed. The switch flexibly copes with new or modifies specifications and standards which might be established in the future for processing RM and OAM cells. Each link interface portion 1 of the ATM switch includes an input cells processing portion 7 and an output cell processing portion 8 provided at the input side and output side of a cell exchange portion 2, and cooperates with a control information maintenance portion 9 to execute application of switching information that the cell exchange portion 2 requires in input cells, and rewriting of ATM cell headers of input cells to and output cells from the cell exchange portion 2. The input cell processing portion 7 and the output cell processing portion 8 of each include a fixed sequencer and a microcode sequencer to execute complex protocol processing such as OAM, RM and other control functions in the microcode sequencer.

18 Claims, 13 Drawing Sheets

RM CELL

| FIELD | OCTET | BIT(s) | DESCRIPTION |
|---|---|---|---|
| Header | 1-5 | all | ATM Header |
| ID | 6 | all | Protocol Identifier |
| DIR | 7 | 8 | Direction |
| BN | 7 | 7 | BECN Cell |
| CI | 7 | 6 | Congestion Indication |
| NI | 7 | 5 | No Increase |
| RA | 7 | 4 | Request/Acknowledge |
| Reserved | 7 | 3-1 | Reserved |
| ER | 8-9 | all | Explicit Cell Rate |
| CCR | 10-11 | all | Current Cell Rate |
| MCR | 12-13 | all | Minimum Cell Rate |
| QL | 14-17 | all | Queue Length |
| SN | 18-21 | all | Sequence Number |
| Reserved | 22-51 | all | Reserved |
| Reserved | 52 | 8-3 | Reserved |
| CRC-10 | 52 | 2-1 | CRC-10 |
|  | 53 | all |  |

FIG. 3

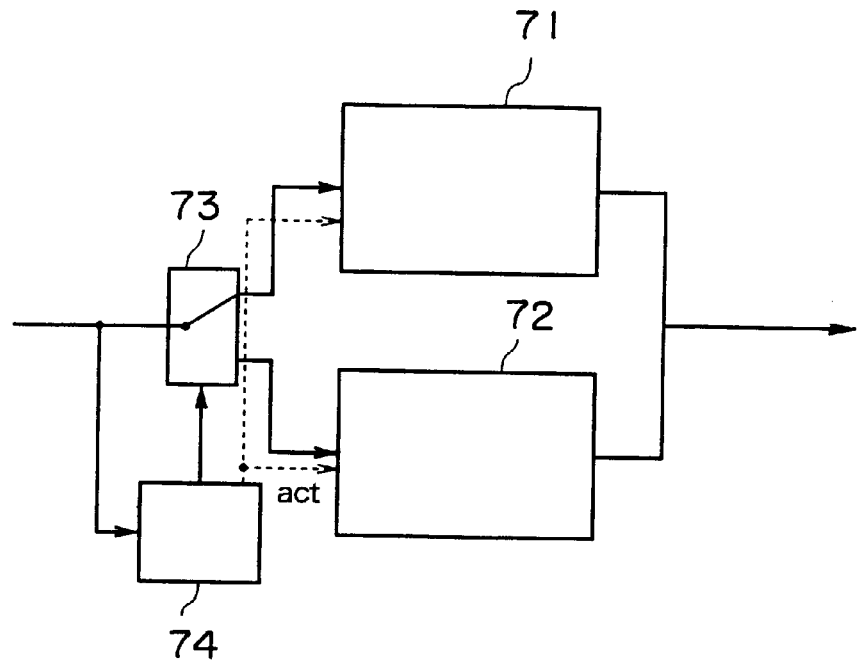
F I G. 6A
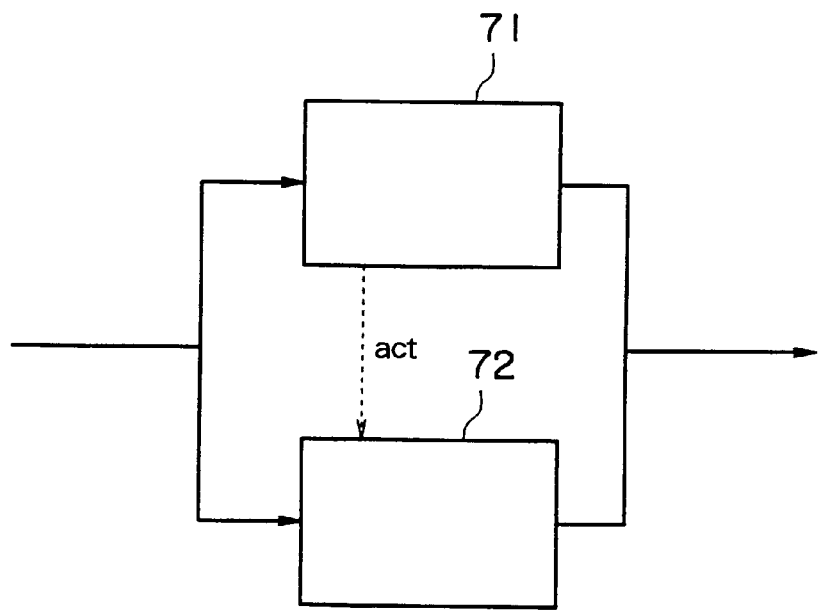
F I G. 6B

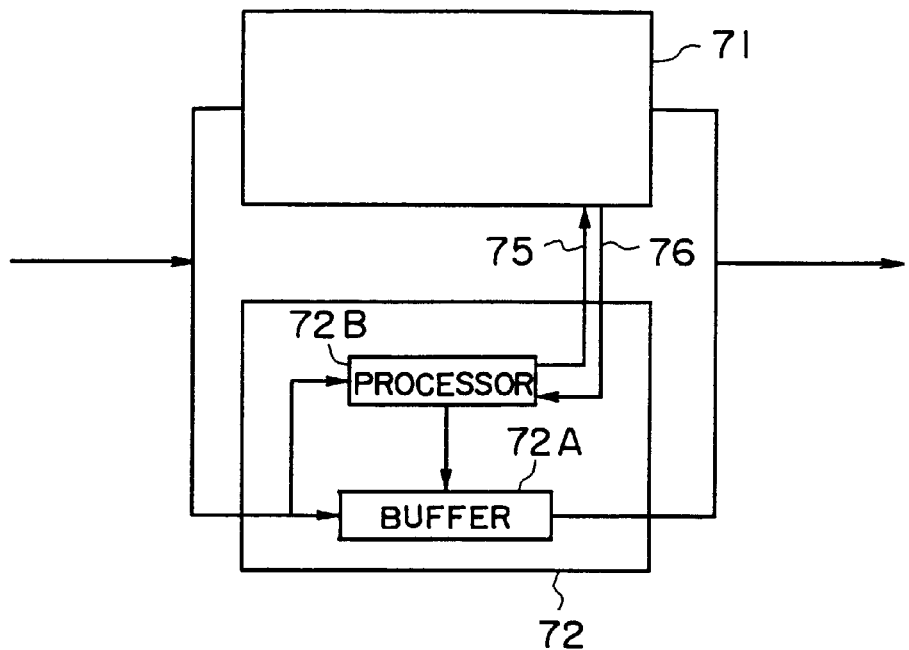
F I G. 7
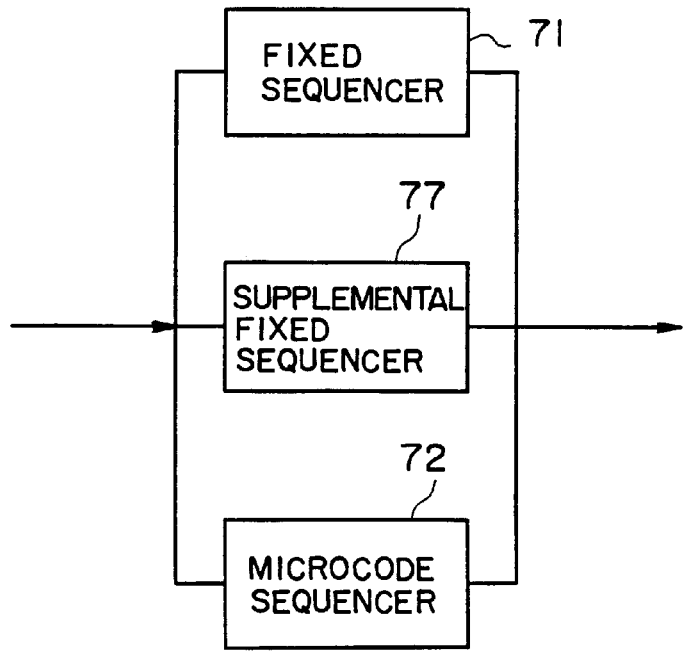
F I G. 8

ATM SWITCH AND ATM SWITCHING SYSTEM

BACKGROUND OF THE INVENTION

This invention relates to an ATM switch (Asynchronous Transfer Mode exchanger) and an ATM switching system, more particularly, to an ATM switch performing complicated protocol management required for ABR transmission (Available Bit Rate communication) while maintaining a high switching function.

ATM transmission uses "cells" as units of transmission data. Cells have fixed and relatively short data lengths than those of typical packets. Fixed data lengths permit unification of cell formats (data constructions), and short data lengths decrease the residence time of transmission data in switches during stored forward switching. These factors contribute to a decrease in data residence time in ATM switches and high-speed data exchange or transfer.

FIG. 15 shows an example of conventional ATM switches.

As shown in FIG. 15, an ATM switch is typically divided into a cell exchange portion 152 for exchanging ATM cells and link interface portions 151-i, 151-j for applying information to be exchanged and for rewriting ATM cell headers. The link interface portions 151-i and 151-j are connected to a bass via physical layers 153-i and 153-j, respectively.

In conventional systems, processing to cells was done in a fixed type sequencer in order to make use of the aforementioned properties of ATM transmission. That is, the link interface portion 151-i contains an input fixed sequencer 155-i located at the input side of the cell exchanger 152 and an output fixed sequencer 156-i located at the output side of the cell exchanger 152. These input fixed sequencer 155-i and output fixed sequencer 156-j can execute application or removal of switching information required in the cell exchanger 152-i for input cells to the cell exchange portion 152 and usual jobs such as rewriting of ATM cell headers for input cells to and output cells from the cell exchange portion 152.

Fixed sequencers, however, cannot deal with complicated protocol management such as ABR (Available Bit Rate) processing. Therefore, the system relied on the CPU 154-i outside the link interface 151-i for such functions, and did not incorporate means therefor on the LSI substrate forming the link interface 151-i.

Although the ATM transmission system intends high switching, it must execute complicated protocol management at a high speed in order to execute network control, especially OAM (Operation, Administration and Maintenance), and to execute ABR processing, especially RM (Resource Management) for realizing a traffic management function.

Since conventional systems could not sufficiently cope with ABR processing and other complicated cell processing by using fixed sequencers, an external processor is relied upon for these jobs. In this case, data must be transferred once to the external processor and retransferred back to the link interface after the jobs in the external processor. Therefore, it could not ensure an acceptable throughput of data and to increase the performance of the system on ABR cell processing to the maximum limit. Moreover, the control by the external processor applies a load also to normal switching jobs of the ATM switch, which results in a delay of usual switching jobs.

SUMMARY OF THE INVENTION

It is therefore an object of the invention to provide an ATM switch and an ATM switching system that executes processing on control cells (for example, OAM cells, RM cells, and so forth) in the same flow as that of processing for normal cells and easily performs complicated protocol management in input and output cell processors at a high speed. Another object of the invention is to provide an ATM switch and an ATM switching system that can transfer control cells between the input cell processor and the output cell processor upon RM cell processing, OAM cell processing, and so forth, and can sufficiently cope with the complicated protocol processing.

Among various control functions including OAM and RM functions, some functions that are not defined or established by ATM Forum, etc. Cannot be designed with fixed sequencers. It is therefore another object of the invention to provide an ATM switch and an ATM switching system that can flexibly cope with future addition and modification of specifications and standards of protocol processing by employing programmable microcodes.

According to the invention, there is provided an ATM switch comprising: a cell exchange portion for exchanging ATM cells; and link interface portions for applying switching information required in the cell exchange portion and for rewriting cell headers, each link interface portion including: an input cell processing portion having a programmable first processing means for executing processing on control cells among data processing to input cells into the cell exchange portion; an output cell processing portion having a programmable second processing means for executing processing on control cells among data processing to output cells from the cell exchange portion; and a control information maintenance portion having a programmable third processing means for storing control information on switching behaviors and for executing maintenance and operation processing in a linkage with the input cell processing portion and the output cell processing portion.

The input cell processing portion and/or the output cell processing portion includes a fixed sequencer for executing jobs concerning normal (or fixed) exchange behaviors and a microcode sequencer for executing jobs concerning maintenance and operation behaviors (or undefined, variable behaviors) which are not done by the fixed sequencer.

The ATM switch further includes a control information portion for storing information on maintenance and operation, and the control information maintenance portion executes maintenance and operation processing in a linkage with the input cell processing portion and the output cell processing portion by referring to the information of the control information portion.

The ATM switch further includes a return-back data path between the input cell processing portion and the output cell processing portion to adequately switching information on control cells.

According to the invention, there is also provided an ATM switching system comprising:
  a cell exchange portion for exchanging ATM cells; and
  link interface portions for applying switching information required in the cell exchange portion and for rewriting cell headers, each link interface portion including an input cell processing portion having a programmable first processing means for executing processing on control cells among data processing to input cells into the cell exchange portion, an output cell processing portion having a programmable second processing means for executing processing on control cells among data processing to output cells from the cell exchange portion, a control information maintenance portion having a programmable third processing means for storing control information on switching behaviors and for executing maintenance and operation processing in a linkage with the input cell processing portion and the output cell processing portion;

physical layers for inputting and outputting ATM cells with the link interface portions; and terminals connected to the physical layers by physical links.

BRIEF DESCRIPTION OF THE DRAWINGS

FIG. 3 is a format of RM cells;

FIGS. 6A and 6B are construction diagrams of cell identifier means;

FIG. 7 is a construction diagram for cooperative behaviors between a fixed sequencer and a microcode sequencer;

FIG. 8 is a construction diagram of the input cell processor including a supplemental fixed sequencer;

FIG. 15 is a construction diagram of a conventional ATM switch.

DETAILED DESCRIPTION OF THE PREFERRED EMBODIMENTS

Figure 1:
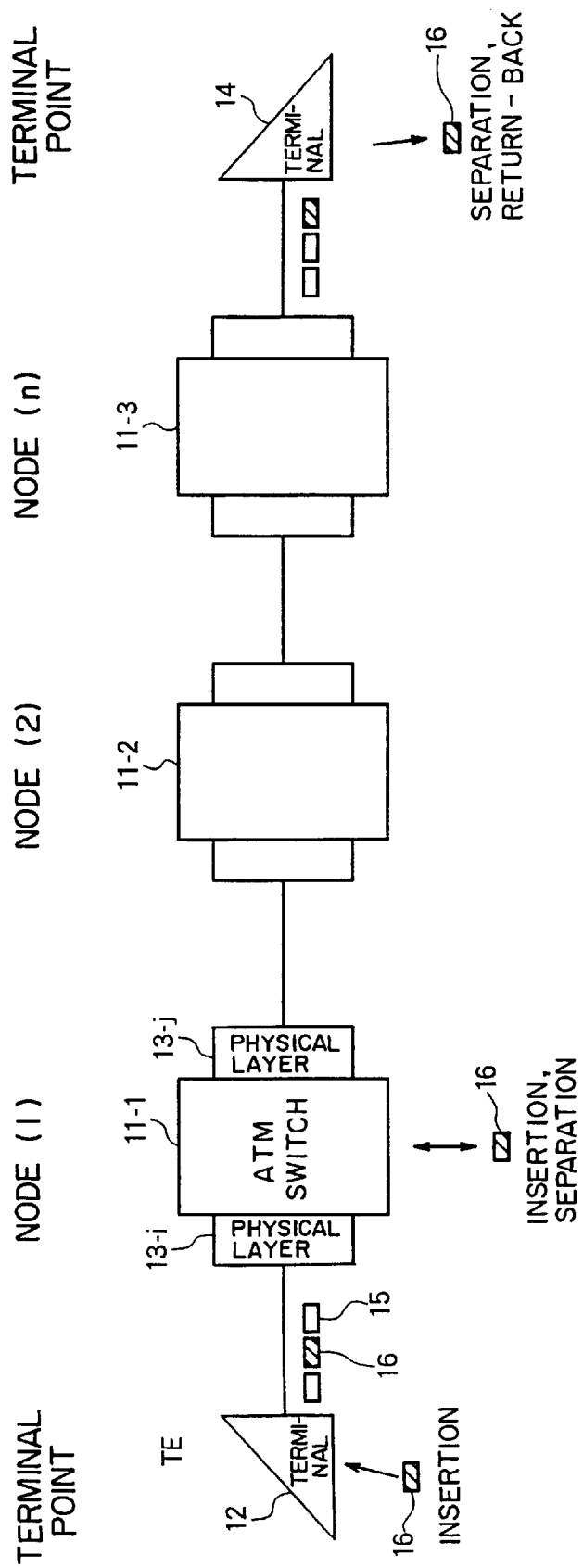
FIG. 1 is an explanatory diagram of an ATM switching network related to the invention.

An ATM switching network related to the present invention is shown in FIG. 1.

A cell 15 sent from a transmitter terminal 12 is switched appropriately by an ATM switch 11-1 via an input-side physical layer 13-i, and transferred to the next stage through an output-side physical layer 13-j. The next-stage ATM switch 11-2, through a further ATM switch 11-3, if necessary, transfers the cell to a desired receiver terminal 14.

Control functions in the network, e.g. OAM (Operation, Administration and Maintenance) function and RM (Resource Management) function are explained below.

(1) OAM function

OAM (Operation, Administration and Maintenance) is a function of informing a user of any malfunction in devices within the network and switching the devices to standby devices. For example, it includes jobs of monitoring performances, detection of errors, determination of error sites, system protection, transfer of error information/performance report, return-back test, pass-through tests, and so forth.

As shown in FIG. 1, a flow of a control cell (OAM cell in this example) 16 along the same path as that of a user's information cell is established by inserting the control cell (OAM cell) 16 in a user's vacant cell portion from the terminal point of the connection and by separating it at the other terminal point. That is, in an OAM flow, bidirectional exchange of information is done at opposite ends of the connection, and aforementioned jobs are performed. Insertion and separation of OAM cells may be executed at appropriate points of connection in lieu of terminal ends. OAM cells can be monitored at each point of connection.

More specifically, during an error test, for example, a switch that detected an error generates an alarm indication signal cell (AIS cell) and sends it to a receiver terminal. Then, the receiver terminal sends back a remote detect indication (RDI) cell to a transmitter terminal.

During a performance test or pass-through test, a connection confirmation (CC) cell or performance management (PM) cell are inserted individually from a switch at a predetermined connection point for the test, and the cell is separated and measured in another switch.

During a return-back test, a loop-back cell (LP cell) is inserted in an arbitrary test interval, and the returned cell is separated for the test.

Figure 2:
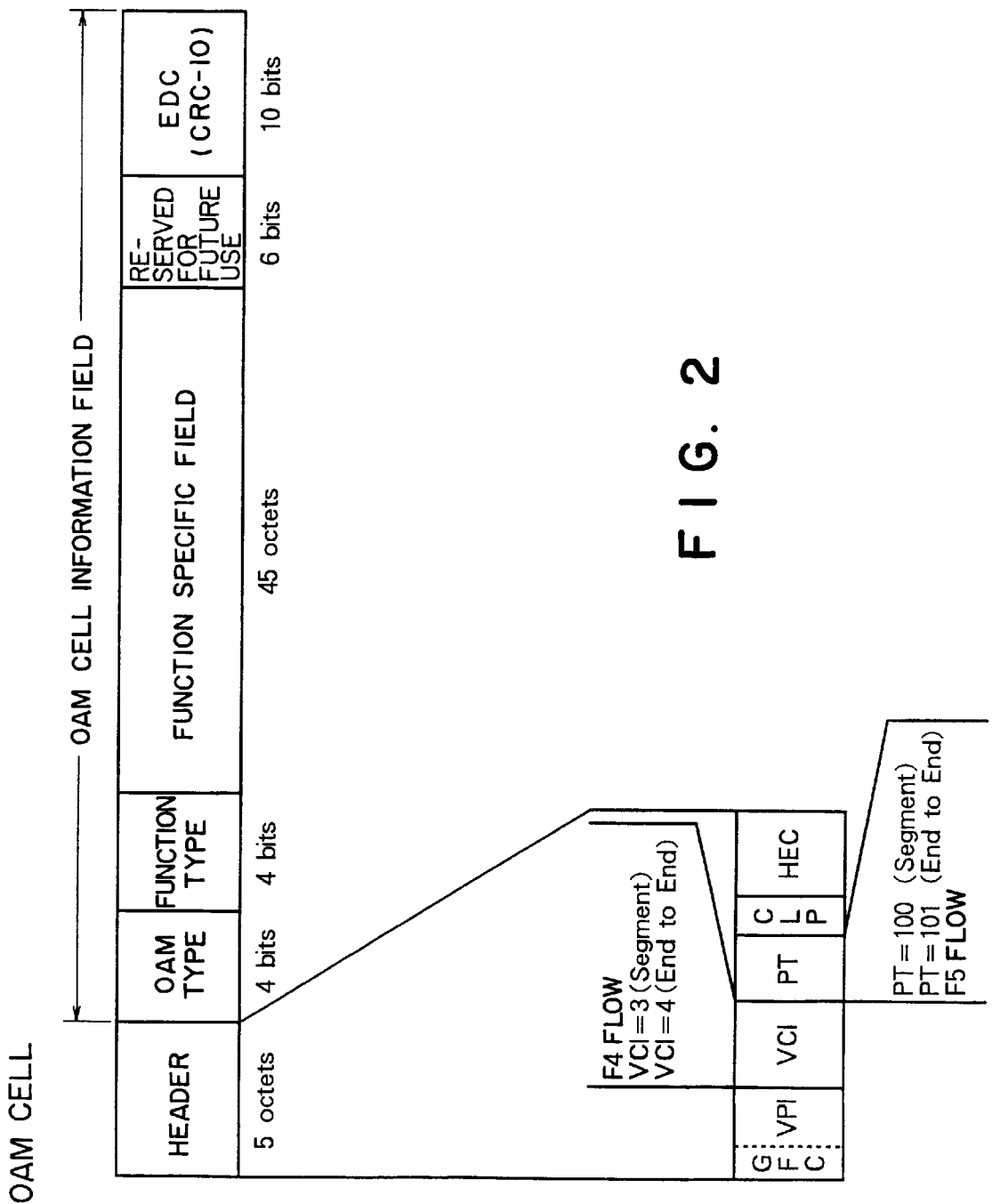
FIG. 2 is a format of OAM cells.

FIG. 2 shows an example of OAM cell in which:
GFC is Generic Flow Control,
VPI is Virtual Path Identifier,
VCI is Virtual Channel Identifier,
PT is Payload Type,
CLP is Cell Loss Priority, and
HEC is Header Error Control.

(2) RM function

ABR (Available Bit Rate) service is a new ATM layer service class having, for example, the function of informing a user of available transmission bands and rates. In order to realize this function, a resource management (RM) cell is used. The RM cell has the function of informing a transmitter of any congestive status and the function of decreasing the traffic of transmitted cells and suppressing an increase in cell rate. The opposite function of informing a receiver of any congestive status, contrary to the function of the RM cell, is EFCI (Explicit Forward Congestion Indication).

Behaviors for the RM function start with periodically sending the control cell 16 (RM cell in this example) from a terminal or the ATM switch for propagation in the network, as shown in FIG. 1. The RM cell is returned back from the receiver terminal to the transmitter terminal. In this process, if congestion information or slowdown information is contained, then the transmitter terminal decreases the cell rate to remedy the congestive status.

Insertion and separation of cells explained above are executed at points of connection or terminal end points in the ATM switching network as shown in FIG. 1.

FIG. 3 shows an example of RM cell.

Congestion information in a first method is given by using CI (Congestion Indication) and by setting CI=1. When the transmitter separates the RM cell and detects CI=1, it decreases the cell rate. In a second method, ER (Explicit Cell Rate) is used. When the transmitter separates the RM cell and detects that the value of ER in the RM cell is smaller than the allowed cell rate (ACR), it decreases ACR to the value of ER to decrease the cell rate.

Figure 4:
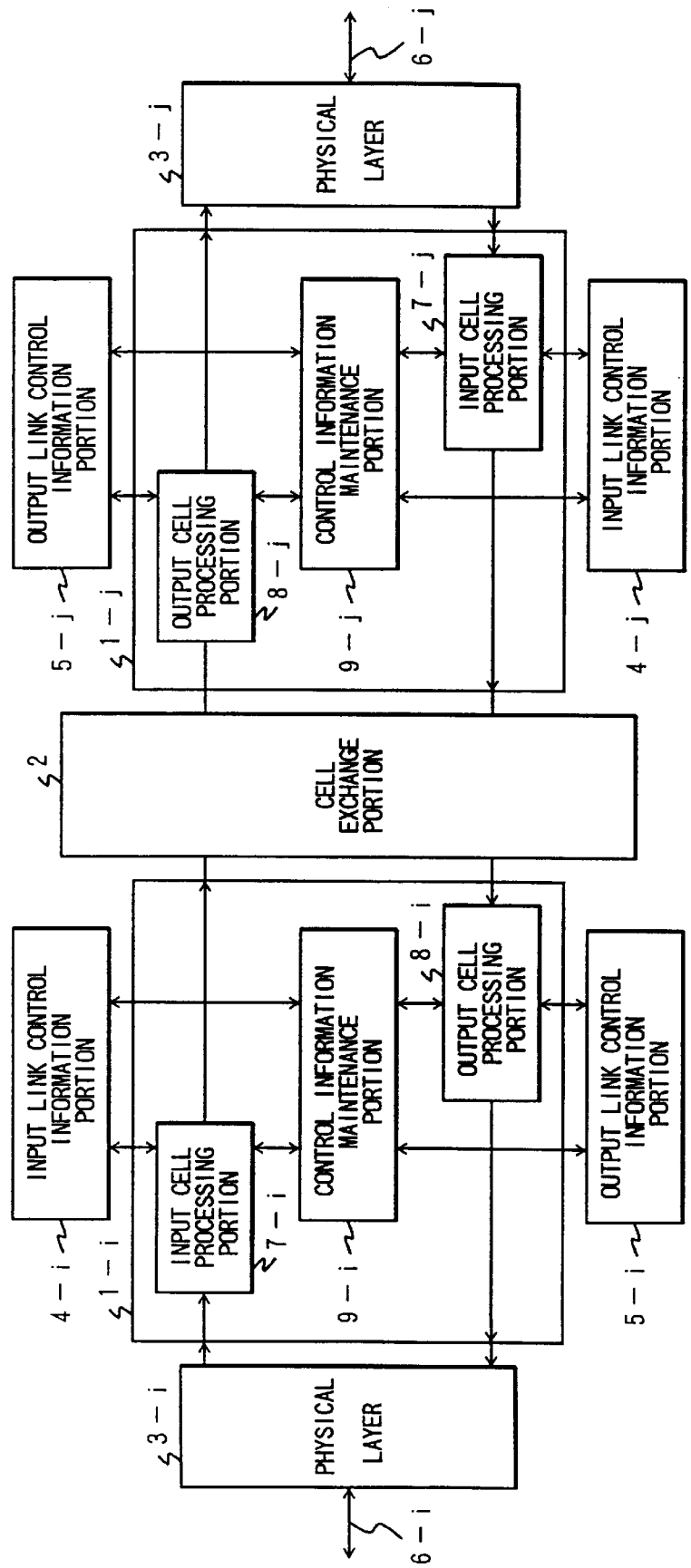
FIG. 4 is a construction diagram of an ATM switch according to a first embodiment of the invention.

FIG. 4 shows an ATM switch taken as an embodiment of the invention.

The ATM switch generally comprises a cell exchange portion 2, and link interface portions 1 (the suffixes "-i", "-j", etc. in FIG. 4 indicate "i-numbered", "j-numbered", and so on.

The cell exchange portion 2 is a switch for switching ATM cells. It may be a space-divisional or time-divisional switch such as XB (crossbar) switch, Banyan switch, and common-bass-type or output-buffer-type switch, for example. The link interface portion 1 performs jobs of applying switching information and rewriting headers of ATM cells. The link interface portions 1 have a plurality of links depending on its scale. The link interface portions 1 are connected physical links 6 via physical layers 3 corresponding to bass rates and other factors of respective links.

Connection between the physical layers 3 and the link interface portions 1 of the switch is standardized. Usable for the connection is, for example, UTOPIA (Universal Test and Operation Physical Layer Protocol Interface for ATM) in the process of standardization by ATM Forum as interface between the ATM layer and the physical layer, or other appropriate system.

Each link interface portion includes an input cell processor 7 located at the input side to the cell exchange portion 2, and an output cell processor 8 located at the output side from the cell exchange portion 2. The input cell processor 7, output cell processor 8 and control information maintenance portion 9 cooperate to execute processing to input cells to the cell exchange portion 2, such as application of switching information required in the cell exchange portion 2, and processing to input cells to and output cells from the cell exchange portion 2, such as rewriting of ATM cell headers.

The control information maintenance portion 9 is responsive to information of the input cell processing portion and the output cell processing portion 8 to insert and separate control cells and to execute OAM, RM and other complicated protocol processing.

An input link control information portion 4 and an output link control information portion 5 are provided outside the link interface portions 1 to store and control bulky data like that necessary for execution of control functions (OAM, RM and other functions). An example of input link control information is statistical information of each logic channel collected on the basis of the input cells.

Figure 5:
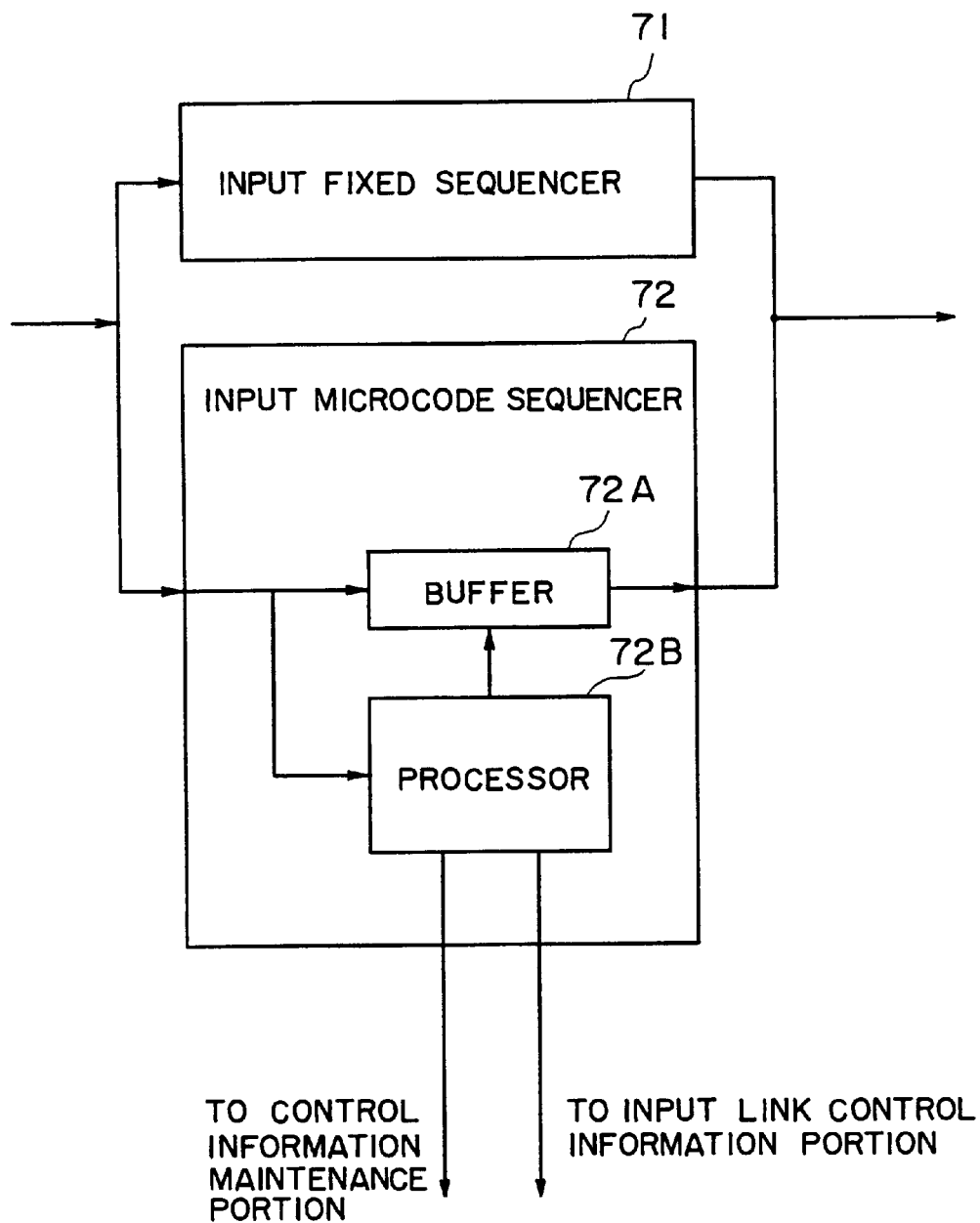
FIG. 5 is a construction diagram of an input cell processor.

FIG. 5 shows an example of the input cell processing portion 7.

Input cells are appropriately distributed to an input fixed sequencer 71 or an input microcode sequencer 72. The input fixed sequencer 71 executes addition of data for switching behaviors, or other usual switching functions, a in the same manner as conventional fixed sequencers. The input microcode sequencer 72 contains a first-in first-out (FIFO) buffer 72A, for example, and a processor 72B for its rewriting or other control. In addition to the rewriting control of the buffer 72A, the processor 72B exchanges information with the control information maintenance portion 9 and the input link control information portion 4. Accordingly, the input microcode sequencer 72 executes complicated cell processing and protocol processing.

Explained below is a general aspect of behaviors of the input cell processing portion 7 used in the invention with reference to FIG. 4.

Hereinbelow, ATM cells sent from a physical layer to the cell exchange portion are called input cells, and ATM cells sent from the cell exchange portion to a physical layer are called output cells.

Input cells transferred from a physical link 6-i through the physical layer 3-i are introduced to an input cell processing portion 7-i of the link interface portion 1-i. The input cell processing portion 7-i identifies required cell processing from headers, etc. of the cells, and executes the cell processing in a predetermined sequencer. For example, the OAM cell and the RM cell have the cell formats shown in FIGS. 2 and 3, and the cells can be identified from VCI (Virtual Channel Identifier) and PT (Payload Type) in the headers. In the input cell processing portion 7 of FIG. 5, both sequencers 71 and 72 behave in parallel, and one or both of the sequencers perform required processing depending on the types of the identified cells.

The fixed sequencer 71 has a normal cell processing function. That is, it executes jobs determined by the protocol and suitable for execution by an exclusive processing device (fixed sequencer). Main jobs are, for example, application of switching information required for treatments in the cell exchange portion and treatments prior to rewriting, such as application of information for rewriting ATM cell headers.

On the other hand, the input microcode sequencer 72 is appropriately programmable to execute complicated protocol processing and unspecified, unfixed jobs. Main jobs are, for example, treatments on control cells like the OAM and RM cells, and accumulation of statistical information used for monitoring cell flow amounts in individual logic channels.

FIGS. 6A and 6B show examples of identifier means for processing by predetermined sequencers.

In the example of FIG. 6A, an identifier circuit 74 is provided at the input side, and a changeover switch 73 switches cells. In the example of FIG. 6B, one of the fixed sequencer and the microcode sequencer identifies a designated sequencer, and, if it is not the designated sequencer, it gives a notice to the other as shown by the broken line to make it active.

These examples contribute to power saving because one or both of the sequencers remains inactive until it is called up for its own job.

FIG. 7 shows another example of the input fixed sequencer 71 and the input microcode sequencer 72 for cooperative behaviors. This example realizes exchange of data between both sequencers by providing both or one of data lines 75 and 76.

For example, desired information is extracted and introduced, based on judgement of conditions by the input microcode sequencer 72, and the information is transferred to the input fixed sequencer 71 through the data line 75. The input fixed sequencer 71 can perform rewriting of cell data and any other jobs, referring to the information transferred from the data line 75. Conditions to be judged may be congestion, malfunction, and/or any other appropriate materials. In this case, rewriting and other jobs are performed by the fixed sequencer, the rewrite processing is done in a fixed manner. In contrast, the input fixed sequencer 71 may be configured to extract a desired portion from information on cell data and to transfer it to the input microcode sequencer 72 through the data line 76. The input microcode sequencer 72 uses the information transferred from the data line 76 to perform data rewriting and/or other jobs. In this case, a processor 72B can flexibly select an appropriate position to be rewritten, and a buffer 72A can perform the rewriting.

FIG. 8 shows another example of the input cell processing portion 7.

In this example, a supplemental fixed sequencer 77 and the microcode sequencer 72 are provided in addition to the fixed sequencer 71. The supplemental fixed sequencer 77 is configured to execute newly added or established specifications and controls in a fixed manner to support the microcode sequencer 72. Relatively simple jobs (for example, OAM processing) may be assigned to the supplemental fixed sequencer 77 so that the microcode sequencer 72 shares relatively complicated jobs (for example, RM processing) alone.

Two or more of supplemental fixed sequencers 77 may be provided, and an identifier means shown in FIG. 6 to distribute predetermined sequencer jobs to the respective sequencers. Moreover, as shown in FIG. 7, appropriate means for flexibly connecting the input fixed sequencer 71, supplemental fixed sequencer and input microcode sequencer 72 may be provided. In this case, various cooperative operations including rewriting jobs, etc. explained with reference to FIG. 7 can be shared appropriately among individual sequencers.

Figure 9:
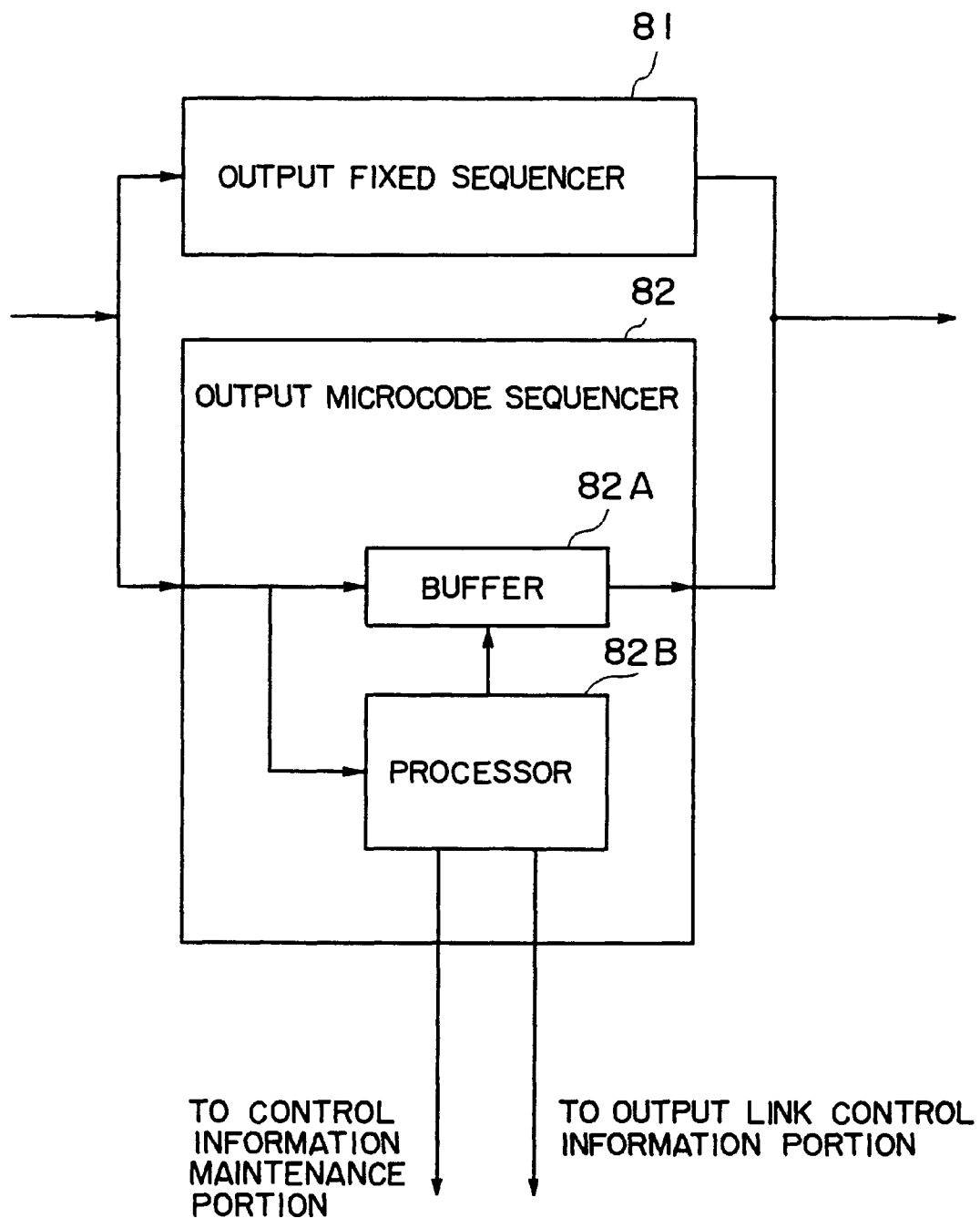
FIG. 9 is a construction diagram of an output cell processor.

FIG. 9 shows an example of the output cell processing portion 8.

Output cells supplied from the cell exchange portion 2 are distributed to an output fixed sequencer 81 or an output microcode sequence 82. The output fixed sequencer 81 executes usual switching functions in the same manner as conventional fixed sequencers. The output microcode sequencer 82 contains a first-in first-out (FIFO) buffer 82A, for example, and a processor 82B for control jobs. In addition to the rewriting control of the buffer 82A, the processor 82B exchanges information with the control information maintenance portion 9 and the input link control information portion 5. Accordingly, the output microcode sequencer 82 executes complicated cell processing and protocol processing.

Explained below is a general aspect of behaviors of the output cell processing portion 8 used in the invention with reference to FIG. 4.

Output cells transferred from the cell exchange portion 2 are given to an output cell processing portion 8-j of the link interface portion 1-i. The output cell processing portion 8-j identifies required cell processing from headers, etc. of the cells, and executes the identified cell processing in a predetermined sequencer. In the example of FIG. 9, both sequencers behave in parallel, and one or both of the sequencers perform required processing determined by the cell headers.

The output fixed sequencer 81 has a normal cell processing function. That is, it executes jobs determined by the protocol and suitable for execution by an exclusive processing device (fixed sequencer). Main jobs are, for example, removal of redundant data attached to the ATM cell and post-rewriting jobs, such as rewriting ATM cell headers. On the other hand, the output microcode sequencer 82 is appropriately programmable to execute complicated protocol processing and unspecified, unfixed jobs. Main jobs are, for example, treatments on the OAM and RM cells as mentioned before, and accumulation of statistical information used for monitoring cell flow amounts in individual logic channels.

Also the output cell processing portion 8, like the input cell processing portion 7 described above, may include identifier means located on the side of the cell exchange portion 2 for predetermined sequencer jobs as shown in FIG. 6. It is also possible to use data lines between the output fixed sequencer 81 and the output microcode sequencer 82 to exchange data and to execute cooperative behaviors in the same manner as the input cell processing portion 7 shown in FIG. 7. Moreover, a supplemental fixed sequencer may be provided as shown in FIG. 8, to add the same functions as those of the input cell processing portion 7.

Figure 10:
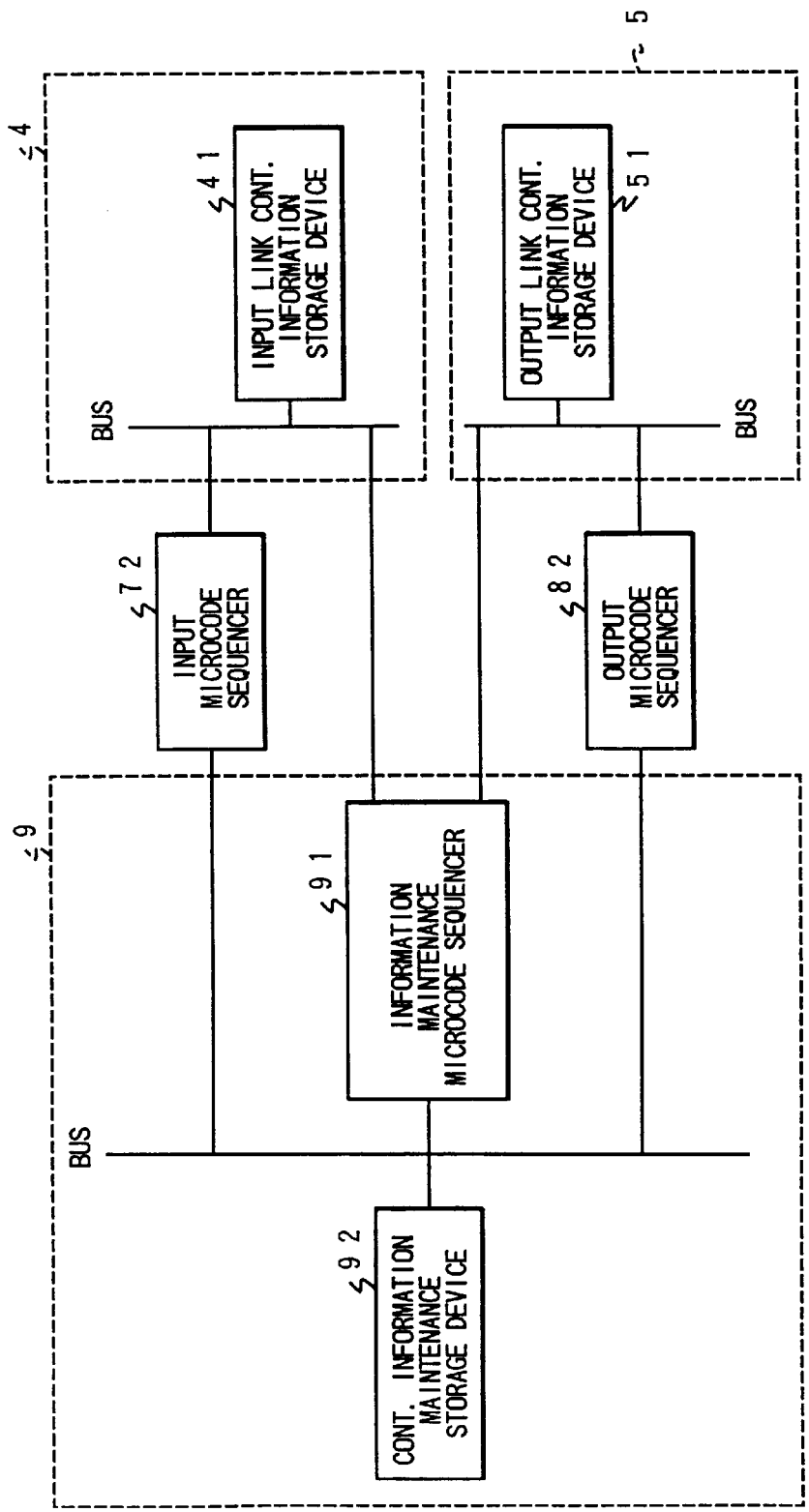
FIG. 10 is a construction diagram of interconnection between microcode sequencers.

FIG. 10 shows connection between microcode sequencers of the link interface portions 1 in relation with the input and output link control information portions 4 and 5.

The control information maintenance portion 9 includes a control information maintenance microcode sequencer 91 and a control information maintenance storage device 92. The control information maintenance microcode sequencer 91 is connected to respective storage devices by basses or other connector means to access them from time to time. The control information maintenance portion 9 is linked with the input microcode sequencer 72 and the output microcode sequencer 82 to maintain or control periodically, or at desired occasions, various data including statistical information of individual logic channels accumulated in the control information maintenance storage device 92, input link control information storage device 41 and output link control information storage device 51. Intervals and sequence of maintenance control jobs largely rely on protocols, and the specification itself is still undefined. Therefore, processing by a programmable microcode sequencer is additionally used together with those by exclusive processing means (fixed sequencer, etc.).

Relatively small volumes of data like those for RM processing may be stored in the control information maintenance storage device 92 within the link interface portion 1. Relatively large volumes of data like those for OAM processing may be stored in the input link control information storage device 41 and/or output link control information storage device 51 outside the link interface portion 1. These and other data may be stored in other appropriate storage devices.

The input cell processing portion 7 is connected to the input cell control information portion 4, and the output cell processing portion 8 to the output link control information portion 5, by basses or other connector means. The input microcode sequencer 72 is connected to the input link control information storage device 41 and the control information maintenance storage device 92 by basses or other connector means to appropriately access them. The output microcode sequencer 82 is connected to the output link control information storage device 51 and the control information maintenance storage device 92 by basses or other connector means to appropriately access them. Control cells including RM and OAM cells are delivered between the input cell processing portion 7 and the output cell processing portion 8 via the control information maintenance microcode sequencer 91. As to the RM cell, since information is needed immediately, information is accumulated and accessed for individual channels. As to the OAM cell, however, access to information will be less frequent. For example, it is sufficient to access once a second.

Figure 11:
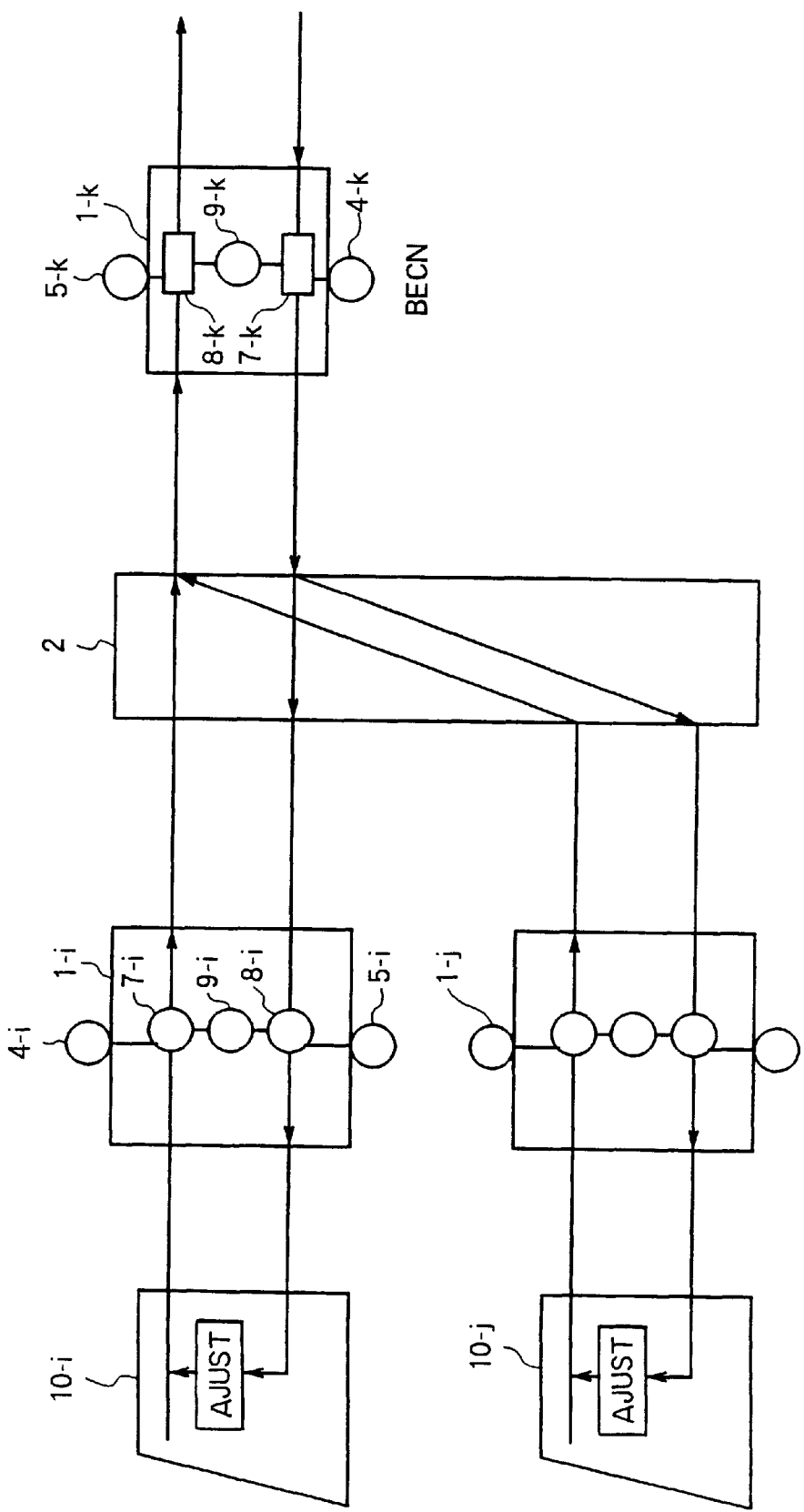
FIG. 11 is an explanatory diagram of congestion processing by RM cells.

FIG. 11 shows an explanatory diagram of behaviors for congestion processing by an RM cell.

When cells are transmitted from the transmitter terminal 10-i, input cells are exchanged in the cell exchange portion 2 through the link interface portion 1-i. Output cells from the cell exchange portion 2 are transferred through the link interface portion 1-k to the next stage. Similarly, when cells are transmitted from the transmitter terminal 10-j, input cells introduced through the link interface portion 1-j are exchanged in the cell exchange portion 2. Output cells from the cell exchange portion 2 are transferred through the link interface portion 1-k to the next stage.

Explained below is traffic processing in the link interface portion 1-k.

The transmitter terminal 10-i and 10-j periodically issue RM cells as shown in FIG. 3 between usual user cells. These RM cells are introduced to the cell exchange portion 2 via the link interface portions 1-i and 1-j, respectively. RM cells output from the cell exchange portion 2 are transferred to the link interface portion 1-k.

In the link interface portion 1-k, the output cell processor 8-k extracts RM cells, and the output link control information portion 5-k some pieces of information on CCR, MCR and other cell rates as shown in FIG. 3 from RM cells. The control maintenance microcode sequencer 91-k of the control information maintenance portion 9-k monitors the output link control information portion 5-k at the timing of once per some cells, and obtains the average value of some pieces of information including CCR, MCR, or the like, stored there. The control maintenance microcode sequencer 91-k transfers the average value of CCR, MCR, etc. to the input link control information storage device 41-k of the input link control information portion 4-k. In the input link control information portion 4-k, the input link control information storage device 41-k stores it.

The input microcode sequencer 72 of the input processing portion 7-k calculates ER (Explicit Cell Rate) acceptable for the changeover switch and/or link interface from the average value stored in the input link control information storage device 41-k. After that, the input processing portion 7-k identifies the RM cell returning back from the next stage, compares it with the ER value calculated from the information of the input link control information portion 4, and rewrites the RM cell to the value of ER under the most severe condition.

The output microcode sequencer 82 of the output processing portion 8-k rewrites BN to perform BECN (Backward Explicit Congestion Notification) processing when ER of the RM cell exceeds an acceptable value.

The transmitter terminal devices 10-i and 10-j separate ER from RM cells sent back thereto. If ER is smaller than the allowed cell rate (ACR), they adjust their won flow amounts by decreasing ACR to ER.

Figure 12:
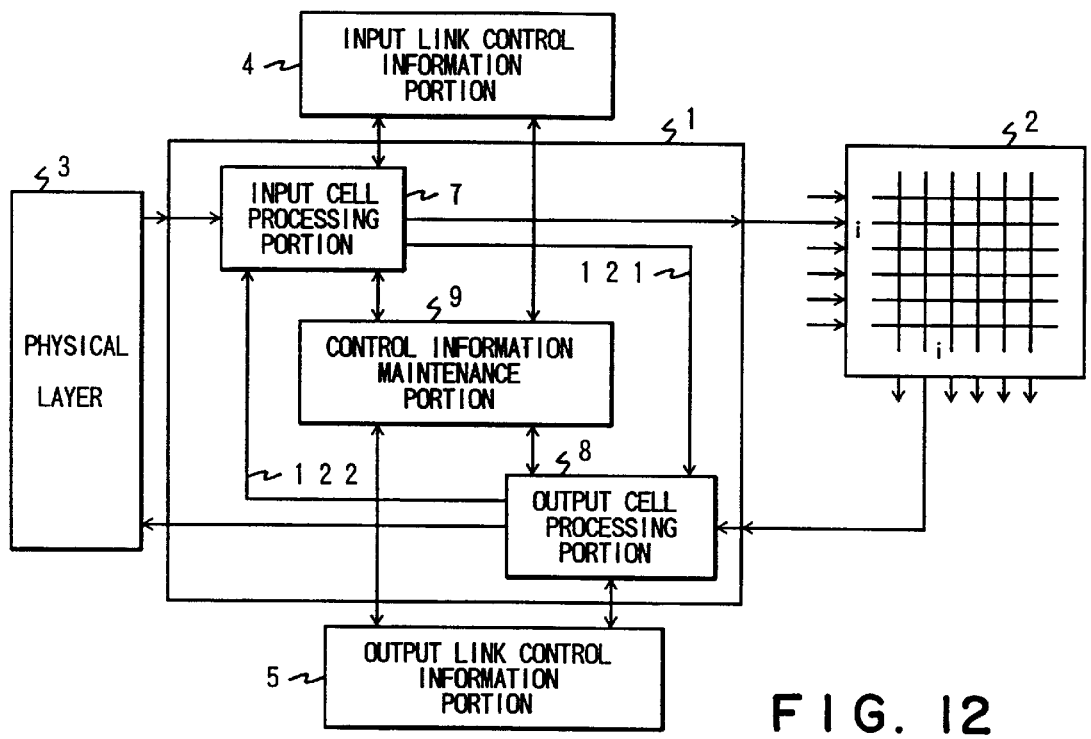
FIG. 12 is a construction diagram of an ATM switch according to a second embodiment of the invention.

FIG. 12 shows a second embodiment of the link interface portion 1 used in the present invention.

The embodiment of FIG. 12 includes data paths 121 and 122 connecting the input cell processing portion and the output cell processing portion in addition to the elements used in the first embodiment. OAM processing, RM processing and other control processing require a function of back-transferring control cells of individual logic channels in response to the status of the switch. Among data paths, the data path 121 sends back control cells from the input cell processing portion 7 of the link interface portion 1 to the output cell processing portion 8 when ATM cells enters in the cell exchange switch, and the data path 122 sends back output cells once passing through the cell exchange portion from the output cell processing portion of the output link interface portion to the input cell processing portion. Both or one of these data paths may be used.

Figure 13:
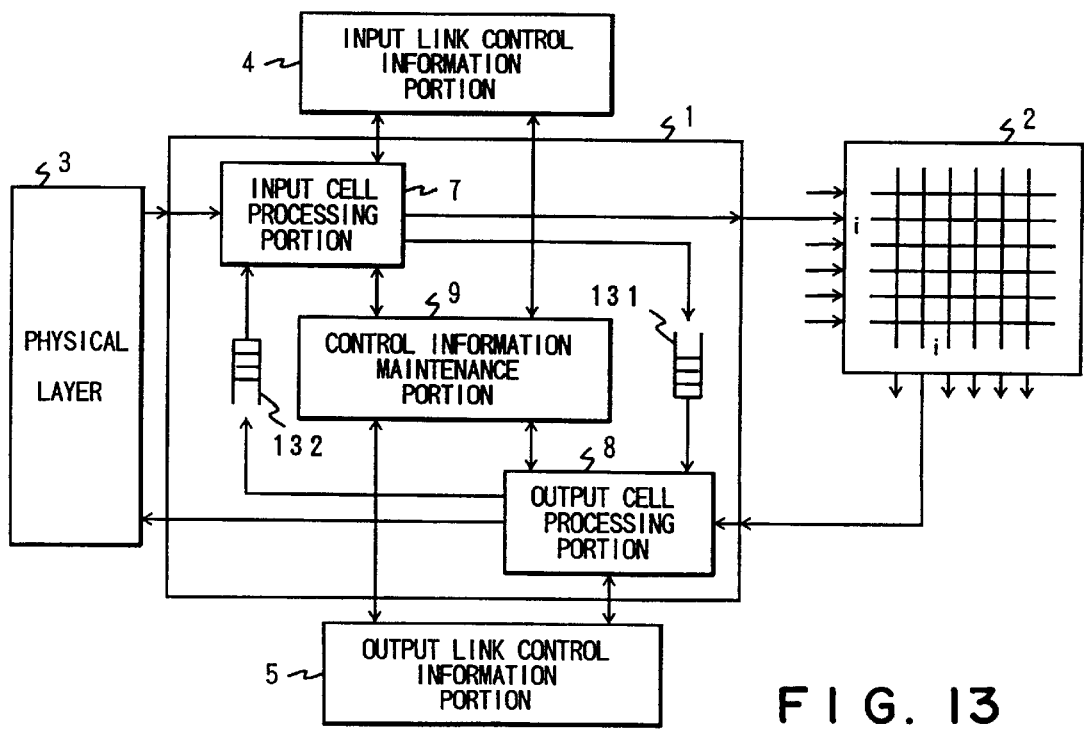
FIG. 13 is a construction diagram of an ATM switch according to a third embodiment of the invention.

FIG. 13 shows a third embodiment of the link interface portion 1 according to the invention. This embodiment additionally uses FIFO (first-in first-out) buffers 131 and 132 in addition to the data paths used in the second embodiment to connect the input cell processing portion and the output cell processing portion 8. The input cell processing portion 7 and the output cell processing portion 8 normally effects processing of input cells or output cells, respectively, the control cells transferred through the data paths are processed by interrupting normal cell processing. Therefore, unoccupied time in normal cell processing must be used for the above-mentioned processing, and FIFO or other type buffers are utilized for time adjustment therefor.

In the second and third embodiments, data paths connecting the input cell processing portion 7 and the output cell processing portion 8 and/or their associated buffers can be controlled by individual microcode sequencers in response to the operating conditions of their processing portions. Since the processing for returning back control cells by the cell processing portion occurs by interrupting normal cell processing, operative conditions of individual cell processing portions must reflected to the transfer timing of the control cells. For this purpose, the return-back data path 121 or the buffer 131 may be controlled by the input microcode sequencer 72 or the output microcode sequencer 82, or may be controlled by the control information maintenance microcode sequencer 91.

Figure 14:
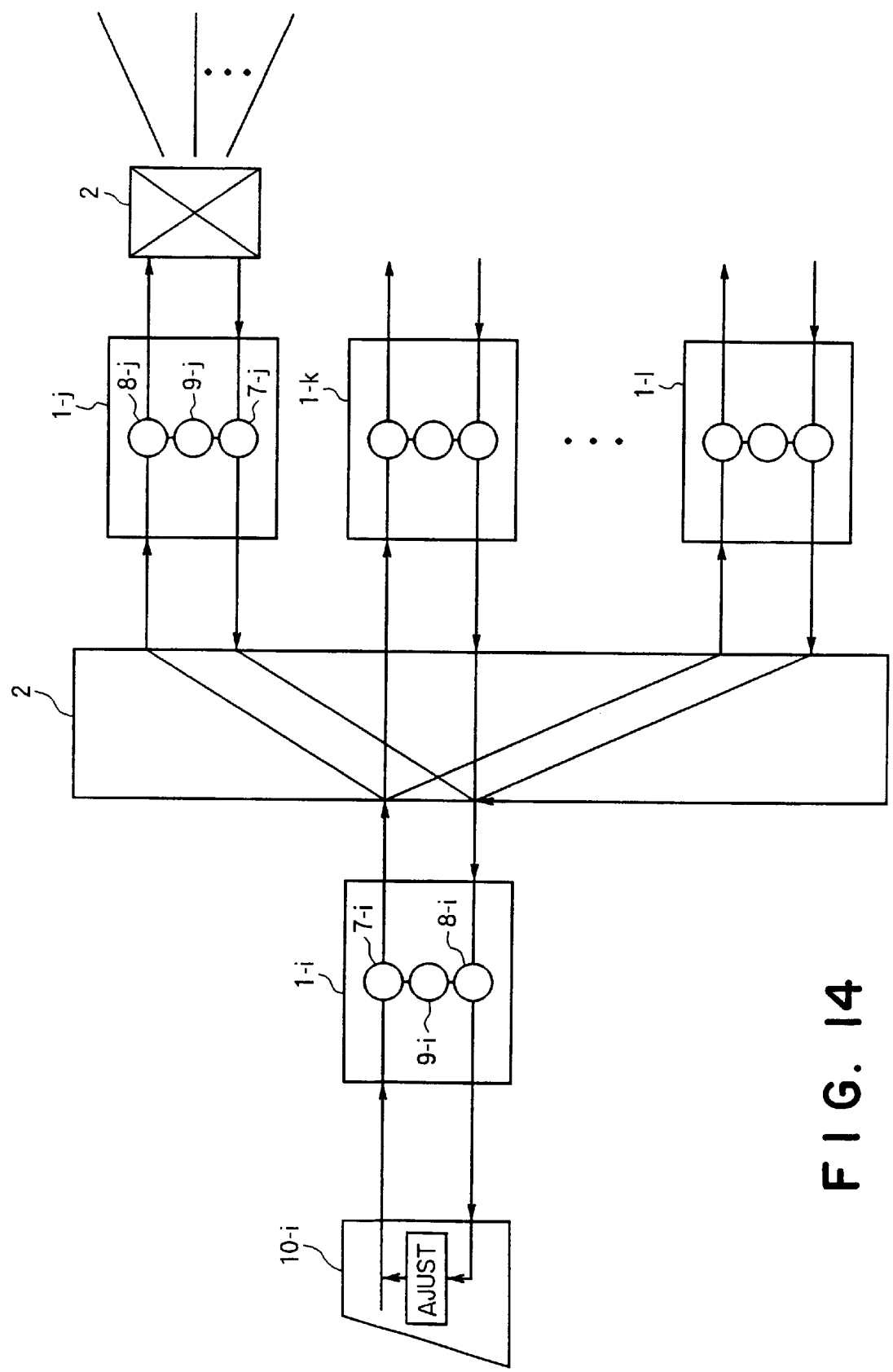
FIG. 14 is an explanatory diagram of congestion processing during broadcasting transmission using a return-back data path.
Figure 1:
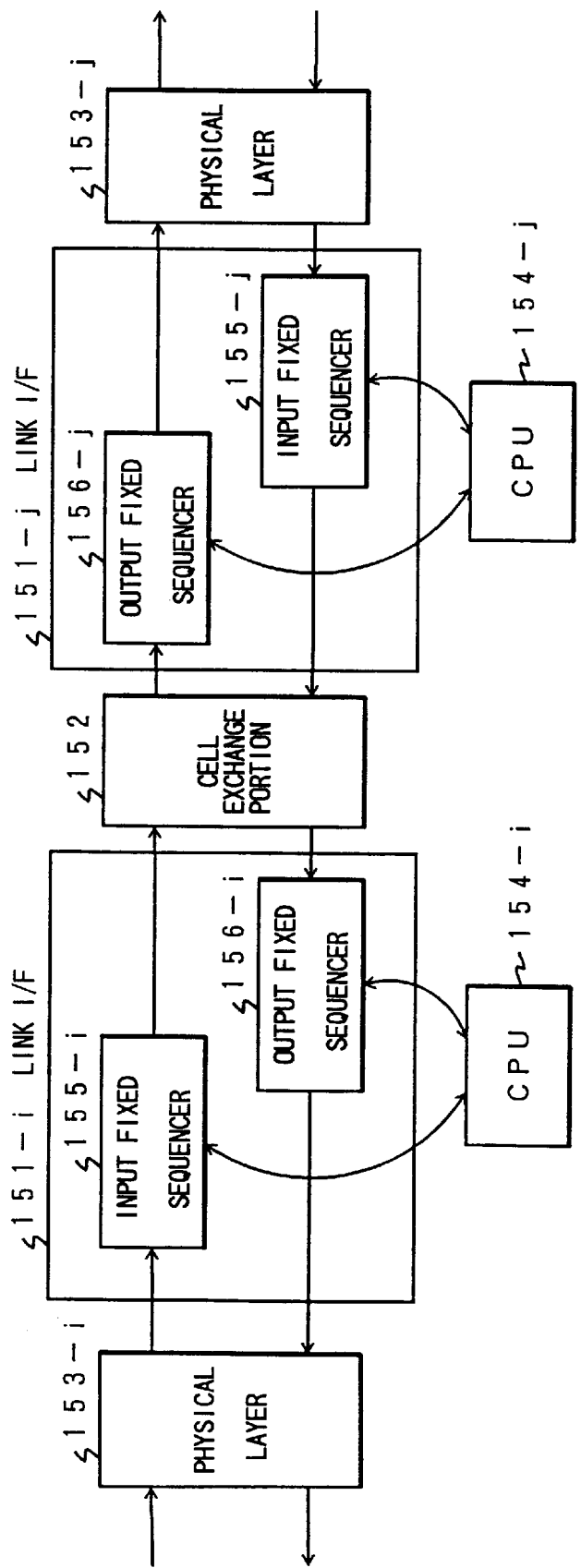

FIG. 14 shows a diagram of for explaining jobs for broadcasting transmission using return-back data paths.

Cells transmitted from the transmitter terminal device 10-i are introduced into the cell exchange portion 2 via the link interface portion 1-i to be switched there. Assume here that output cells from the cell exchange portion 2 are transmitted by broadcasting transmission to the next stage via the link interface portions 1-j, 1-k, . . . 1-l. In some cases, cells sent to the next stage will be further sent to the next stage by broadcasting station.

Explained below is traffic control processing by the link interface portion 1-i.

As shown in FIG. 3, RM cells are generated from the transmitter terminal 10-i in intervals of normal user cells. For broadcasting transmission, RM cells are output from the cell exchange portion 2 via the link interface portion 1-i in the same manner as normal cells, and transferred to receiver terminals through the link interface portions 1-j, 1-k, . . . 1-l. RM cells are also sent back toward the transmitter terminal from the return-back data path 121-i.

RM cells transferred to the receiver terminals, like normal cells, are sent back by the receiver terminals toward the transmitter terminal. Returned RM cells travel through the switch in the opposite route of RM cells sent from the transmitter terminal toward the receiver terminals. Since a plurality of returned RM cells arrive, the switch that sent information by broadcasting transmission executes processing for reducing them into a single RM cell.

RM cells sent back through the link interface portions 1-j, 1-k, . . . 1-l are transferred from the cell exchange portion 2 to the output cell processing portion 8-i in the link interface portion 1-i, and ER is extracted therefrom by the output microcode sequencer 82 to store the value of ER under the most severe condition in the output link control information storage device 51-i. The RM cell is discarded when extraction of ER is finished.

RM cells sent back through the return-back data path 121-i is returned toward the transmitter terminal, taking as the value of ER the value stored in the output link control information storage device 51-i as the value of ER under the most severe condition. Simultaneously with the return-back processing, the value of ER stored in the output link control information storage device 51-i is cleared, and preparation is made to hold the values of the RM cells sent back later through the link interface portions 1-j, 1-k, . . . 1-l.

The transmitter terminal device 10-i separates ER from RM cells sent back thereto. When ER is smaller than the allowed cell rate (ACR), the device adjust its own flow amount by decreasing ACR to ER.

ABR processing can be made by using a maximum cell rate (PCR), minimum cell rate (MCR), cell loss rate (CLR) or any other appropriate element in lieu of ER.

What is claimed is:

1. An ATM switch comprising:

a cell exchange portion for exchanging ATM cells; and link interface portions for applying switching information required in said cell exchange portion and for rewriting cell headers, each said link interface portion including:

an input cell processing portion including a programmable first processing means for executing processing on control cells among data processing to input cells into said cell exchange portion;

an output cell processing portion including a programmable second processing means for executing processing on control cells among data processing to output cells from said cell exchange portion; and a control information maintenance portion including a programmable third processing means for storing control information on switching behaviors and for executing maintenance and operation processing in a linkage with said input cell processing portion and said output cell processing portion, wherein at least one of said input cell processing portion and said output cell processing portion includes:

a fixed sequencer for executing processing on normal switching behaviors; and a microcode sequencer for executing processing on maintenance and operation behaviors that are not processed by said fixed sequencers, undefined behaviors or variable behaviors.

2. The ATM switch according to claim 1 further comprising a data line between said fixed sequencer and said microcode sequencer, said microcode sequencer transmitting predetermined data contained in cells introduced thereto to said fixed sequencer through said data line, said fixed sequencer rewriting cells designated by said data transferred through said data line.

3. The ATM switch according to claim 1 further comprising a data line between said fixed sequencer and said microcode sequencer, said fixed sequencer transferring predetermined data contained in cells introduced thereto to said microcode sequencer through said data line, and said microcode sequencer performing predetermined processing designated by said data transferred through said data line.

4. The ATM switch according to claim 1 wherein at least one of said input cell processing portion and said output cell processing portion further includes a supplemental fixed sequencer for executing fixed processing on maintenance and operation behaviors to supplement processing by said microcode sequencer.

5. The ATM switch according to claim 1 further comprising a control information portion for storing information on maintenance and operation, said control information maintenance portion executing maintenance and operation processing in a linkage with said input cell processing portion and said output cell processing portion by referring to information in said control information portion.

6. The ATM switch according to claim 1 wherein said output cell processing portion extracting cell rate information from said control cells and putting it into storage, said control information maintenance portion obtaining an average cell rate value from said cell rate information by statistical processing, and said input cell processing portion performing congestion processing by rewriting control cells returned back from the next stage by referring to the average cell rate value obtained by said control information maintenance portion and by sending them toward a terminal.

7. The ATM switch according to claim 1 further comprising return-back data paths connecting said input cell processing portion and said output cell processing portion to exchange information on control cells.

8. The ATM switch according to claim 7 wherein one or both of said return-back data paths includes buffer means.

9. The ATM switch according to claim 7 wherein transmission control of said return-back data paths is processed by one or more of said microcode sequencer in said input cell processing portion, said microcode sequencer in said output cell processing portion and said microcode sequencer prepared for said control information maintenance processing.

10. The ATM switch according to claim 7 wherein said input cell processing portion returns said control cells through said return-back data paths; said output cell processing portion discards a plurality of control cells sent back from the next stage and brings the minimum value of cell rate information into storage; and said control information maintenance portion performs broadcasting processing by sending out control cells containing the minimum value of the cell rate information towards a terminal.

11. The ATM switch according to claim 1 wherein said control cells is an RM cell or an OAM cell.

12. The ATM switch according to claim 1 further comprising physical layers for exchanging ATM cells with said link interface portions.

13. An ATM switching system comprising:

a cell exchange portion for exchanging ATM cells; and link interface portions for applying switching information required in said cell exchange portion and for rewriting cell headers, each said link interface portion including an input cell processing portion having a programmable first processing means for executing processing on control cells among data processing to input cells into said cell exchange portion, an output cell processing portion having a programmable second processing means for executing processing on control cells among data processing to output cells from said cell exchange portion, a control information maintenance portion having a programmable third processing means for storing control information on switching behaviors and for executing maintenance and operation processing in a linkage with said input cell processing portion and said output cell processing portion;

physical layers for inputting and outputting ATM cells with said link interface portions; and terminals connected to said physical layers by physical links, wherein at least one of said input cell processing portion and said output cell processing portion includes:

a fixed sequencer for executing processing on normal switching behaviors; and a microcode sequencer for executing processing on maintenance and operation behaviors that are not processed by said fixed sequencers, undefined behaviors or variable behaviors.

14. The ATM switching system according to claim 13 further comprising a control information portion for storing information on maintenance and operation, said control information maintenance portion executing maintenance and operation processing in a linkage with said input cell processing portion and said output cell processing portion by referring to information in said control information portion.

15. The ATM switching system according to claim 13 wherein each said terminal issues control cells for entry into said cell exchange portion, said output cell processing portion extracting cell rate information from said control cells output from said cell exchange portion and putting it into storage, said control information maintenance portion obtaining an average cell rate value from said cell rate information by statistical processing, said input cell processing portion for rewriting control cells sent back from the next stage with reference to the average cell rate value obtained by said control information maintenance portion and for sending it toward a terminal through said cell exchange portion, and said terminal performing congestion processing by transmission control based on the returned control cells.

16. The ATM switching system according to claim 13 further comprising return-back data paths connecting said input cell processing portion and said output cell processing portion to exchange information on control cells.

17. The ATM switch according to claim 16 wherein transmission control of said return-back data paths is processed by one or more of said microcode sequencer in said input cell processing portion, said microcode sequencer in said output cell processing portion and said microcode sequencer prepared for said control information maintenance processing.

18. An ATM switching system comprising:

a cell exchange portion for exchanging ATM cells; and link interface portions for applying switching information required in said cell exchange portion and for rewriting cell headers, each said link interface portion including an input cell processing portion having a programmable first processing means for executing processing on control cells among data processing to input cells into said cell exchange portion, an output cell processing portion having a programmable second processing means for executing processing on control cells among data processing to output cells from said cell exchange portion, a control information maintenance portion having a programmable third processing means for storing control information on switching behaviors and for executing maintenance and operation processing in a linkage with said input cell processing portion and said output cell processing portion;

physical layers for inputting and outputting ATM cells with said link interface portions;

terminals connected to said physical layers by physical links; and return-back data paths connecting said input cell processing portion and said output cell processing portion to exchange information on control cells, wherein said terminals issue control cells for entry into said cell exchange portion, said input cell processing portion returning said control cells through said return-back data path, said output cell processing portion discarding a plurality of control cells sent back from the next stage and bringing the minimum value on the cell rate information into storage, said control information sending out control cells containing said minimum value of the cell rate information toward the terminals, and said terminals performing broadcasting processing by transmission control based on control cells sent back thereto.

* * * * *